United States Patent Office 3,143,309
Patented Aug. 4, 1964

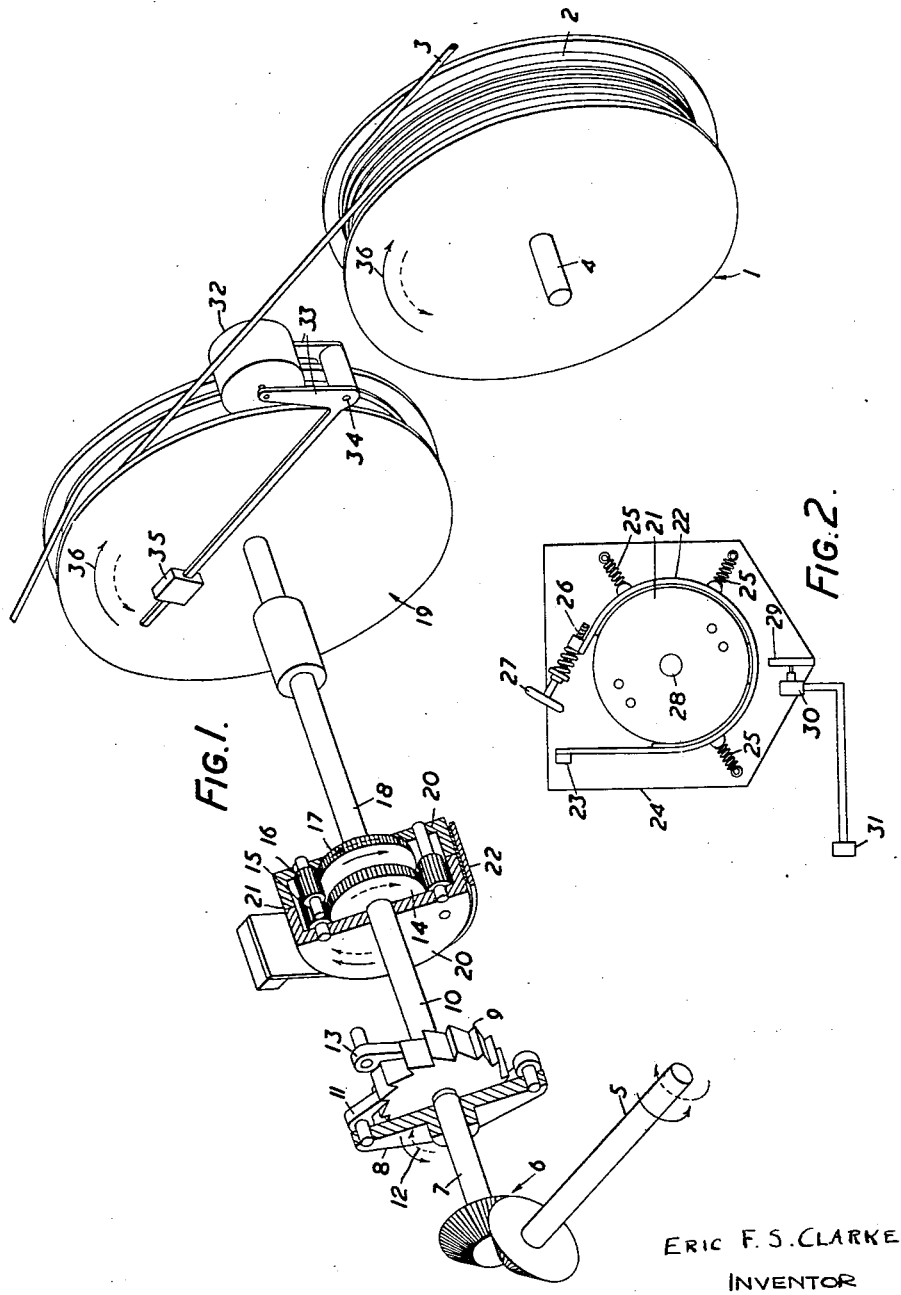

3,143,309
MACHINERY FOR LAYING AND RECOVERING SUBMARINE CABLE
Eric Fifield Stuart Clarke, Kenton, Harrow, England, assignor to Her Majesty's Postmaster General, London, England
Filed Apr. 26, 1962, Ser. No. 190,379
Claims priority, application Great Britain May 4, 1961
7 Claims. (Cl. 242—47.09)

This invention relates to machinery for laying and recovering submarine cable.

In such machinery, there is commonly provided a main cable winding means, e.g. a drum which can be alternatively braked or driven and round which several turns of cable are taken. It is also known to provide a series of sheaves instead of the drum, the cable being arranged to make less than one turn round each sheave in sequence.

In such machinery, the tension in the cable at the high-tension side is a multiple of the tension at the low-tension side and it is clearly important that the tension on the low-tension side should be carefully controlled. The cable stretches under tension and the peripheral speed of the drum or sheaves is equal to the linear speed of the cable at the point where the cable approaches the drum or sheave. Thus, when laying cable, the peripheral speed of the drum is that of the cable as it approaches from the cable-ship tank on the low-tension side. Where the cable leaves the drum it is under tension and has stretched and consequently moves at a linear speed greater than the peripheral speed of the drum or sheave, so that there is slipping between cable and drum at the high-tension side. When recovering cable under controlled conditions the converse is the case and there is slip between cable and drum only at the low-tension side.

In known machinery, a back-tensioning sheave is provided which can be driven or braked. The purpose of this is to control the tension in the cable on the low-tension side of the drum. The back-tensioning sheave is coupled by gearing through a free wheel to the drum. Because there is a change of tension in the cable as it traverses the sheave (tension always being greater on the drum side of the sheave than it is on the tank side) the peripheral speed of the sheave should ideally be greater when recovering cable than when laying it. The free wheel operates to allow the back-tensioning sheave to rotate, against the restraint of a brake, at a speed equal to the speed of the cable as it comes from the tank to the sheave, when laying. When recovering the cable the direction of transmission through the free wheel is reversed and the sheave is driven from the drum at a speed determined by the linear speed of the cable at the high-tension side of the drum. The peripheral speed of the sheave therefore exceeds that of the cable passing over it since the cable tension at this point is low. Consequently, there is slip between the cable and the sheave and the back-tension is variable and dependent upon the type and the condition of the cable.

According to the present invention submarine cable laying and recovering machinery includes a cable back-tensioning sheave, a drive transmission between the sheave and the main cable winding device of the machinery whereby the sheave is drivable from the device, and, in that transmission, a coupling having an input shaft rotatable from the device and an output shaft joined to the sheave and an arrangement for controlling the speed of rotation of the output shaft with respect to that of the input shaft, and the torque transmitted to the output shaft.

Preferably, the arrangement permits infinite variation of the speed of the output shaft from a maximum equal to the speed of rotation of the input shaft to zero. The arrangement may take the form of an epicyclic gear having a first sun pinion driven by the input shaft, a second sun pinion driving the output shaft and planet pinions coupling together the first and second sun pinions and mounted in a rotatable carrier whose speed of rotation is controllable to regulate the speed of rotation of the output shaft.

By way of example only, an embodiment of the invention will now be described in greater detail with reference to the accompanying drawings in which:

FIGURE 1 is a perspective view of the main elements of the embodiment in diagrammatic form only, and FIGURE 2 is an elevation of part of the embodiment.

The main cable winding means of the embodiment comprises drum 1 having a peripheral cable receiving surface 2 round which, in use, a submarine cable 3 takes several turns. The drum is mounted upon a shaft 4, part only of which is shown in FIGURE 1, and the drum has the normal driving and braking equipment which is not shown.

Coupled to shaft 4 by suitable gearing (not shown) is a second shaft 5 in turn coupled by bevel gears 6 to a shaft 7 on which is mounted a driving member 8 of a free-wheel device. The other member of the free-wheel device is a ratchet wheel 9 coupled to a shaft 10 which is the input shaft of an epicyclic gear described later. The member 8 carries pawls 11 which are arranged in a manner such that, in conjunction with teeth on wheel 9, the latter can be driven only in the direction of rotation indicated by arrow 12. A pawl 13 fixed to a housing (not shown) enclosing the free-wheel device assists in preventing rotation of the ratchet wheel 9 in the other direction.

Secured to one end of the input shaft 10 is a sun pinion 14 coupled by intermeshing pairs of planet pinions 15, 16 to a second sun pinion 17 secured to an output shaft 18 on which is mounted a back-tensioning sheave 19 round whose cable receiving surface the cable 3 takes one turn only. The planet pinions are rotatably mounted between the end walls 20 of a cylindrical housing 21 enclosing both sun and planet pinions and encircled in part by a brake band and carrying shoe 22.

The shoe 22 is fixed at 23 to a mounting plate 24 which also carries pull-off springs 25 spaced round the shoe and disposed radially with respect to the axis of rotation of shafts 10 and 18 and housing 21. The other end of shoe 22 is secured to a brake adjustor 26 having a manual control handle 27. The mounting plate 24 is movable about the axis 28 of the housing 21 and carries a bottom plate 29 which bears on a load cell 30 connected to an instrument indicated by block 31 and which is calibrated to indicate directly changes in cable tension produced by the brake.

The cable 3 is pressed into contact with the back-tensioning sheave 19 by a jockey roller 32 rotatably mounted between arms 33 of a double armed lever pivoted at 34. A weight 35 is mounted upon one of the other arms of the lever and is adjustable in position along the length of that arm to vary the force exerted upon the cable 3.

When the machinery is used for cable laying, cable 3 passes from the cable tank of the cable ship in which the machinery is installed round sheave 19, round drum 1 and then on to other ancillary equipment including a bow or stern sheave according to the laying method adopted. Drum 1 rotates in the direction indicated by arrow 36 and so sheave 19 is not driven because the free-wheel device does not transmit the rotation of shaft 4 to shaft 10 and the handle 27 is set so that housing 21 does not rotate freely and exerts a braking effect on shaft 18 thereby controlling the cable tension on the low-tension side of drum 1. Springs 25 resist any tendency of the brake lining to seize. When recovering the cable the direction of rotation of drum 1 is reversed and shaft 10 is driven. The torque transmitted to output shaft 18 depends upon the extent to which housing 21 is restrained against rotation and so the speed of rotation of and the torque applied to the sheave 19 can be controlled by adjusting handle 27. The sheave 19 can therefore be made to rotate at such speed that there is not slip between its surface and the cable.

In both laying and recovering, meter 31 indicates cable tension so that the output of the meter may be used to control automatically the application of braking restraint to housing 21.

It will be appreciated that the flat sheave 19 may be replaced by a V-sheave round which the cable takes less than a complete turn or by several V-sheaves round each of which the cable passes in turn taking less than one complete turn in each case, or by any other device used for the control of moving cable, such as a caterpillar or endless belt fitted with means for gripping the cable.

I claim:

1. Submarine cable laying and recovering machinery comprising in combination a cable back tensioning mechanism for gripping the cable by frictional engagement for driving and braking the cable, a main cable winding means, a drive transmission from said winding means to the mechanism whereby the latter can be connected to said winding means for cable driving purposes and disconnected from said winding means for cable braking purposes, and, in that transmission, a coupling comprising an input shaft rotatable from, said winding means, an output shaft joined to the mechanism, and an arrangement for controlling the speed of rotation of the output shaft with respect to the input shaft and the torque transmitted by the latter to the output shaft.

2. Submarine cable laying and recovering machinery comprising in combination a cable back tensioning mechanism for gripping the cable by frictional engagement for driving and braking the cable, a main cable winding means, a drive transmission from said winding means to the mechanism whereby the latter can be connected to said winding means for cable driving purposes and disconnected from said winding means for cable braking purposes, and, in that transmission, a one way clutch for connecting the mechanism to said winding means for driving the cable in one direction only, and for disconnecting the mechanism from said winding means for cable braking purposes, and a coupling drivable through the clutch and comprising an input shaft, an output shaft joined to the mechanism and means for controlling the speed of rotation of the output shaft with respect to the input shaft and the torque transmitted by the latter to the output shaft.

3. Submarine cable laying and recovering machinery comprising in combination a cable back tensioning mechanism for gripping the cable by frictional engagement for driving and braking the cable, a main cable winding means, a drive transmission from said winding means to the mechanism whereby the latter can be connected to said winding means for cable driving purposes and disconnected from said winding means for cable braking purposes, and, in that transmission, an input shaft rotatable from said winding means, an output shaft connected to the mechanism, epicyclic gearing between the input shaft and the output shaft including a first sun pinion on the input shaft, a second sun pinion on the output shaft, planet pinions coupling together the first and second sun pinions, a rotatable carrier on which the planet pinions are rotatably mounted and braking means for the carrier.

4. Submarine cable laying and recovering machinery comprising in combination a cable back tensioning mechanism for gripping the cable by frictional engagement for driving and braking the cable, a main cable winding means, a drive transmission from said winding means to the mechanism whereby the latter can be connected to said winding means for cable driving purposes and disconnected from said winding means for cable braking purposes, and, in that transmission, a one way clutch for connecting the sheave to said winding means for driving the cable in one direction only, and for disconnecting the mechanism from said winding means, an input shaft rotatable through the clutch, an output shaft jointed to the mechanism, epicyclic gearing between the input shaft and the output shaft including a first sun pinion on the input shaft, a second sun pinion on the output shaft, planet pinions coupling together the first and second sun pinions, a rotatable carrier on which the planet pinions are rotatably mounted and braking means for the carrier.

5. Submarine cable laying and recovering machinery comprising in combination a cable back tensioning sheave for gripping the cable by frictional engagement, a main cable winding means, a drive transmission from said winding means to the sheave whereby the latter can be connected to said winding means for cable driving purposes and disconnected from said winding means for cable braking purposes, and, in that transmission, a coupling comprising an input shaft rotatable from said winding means, an output shaft joined to the sheave and an arrangement for controlling the speed of rotation of the output shaft with respect to the input shaft and for controlling the torque applied by the output shaft to the sheave.

6. Submarine cable laying and recovering machinery comprising in combination a cable back tensioning mechanism for gripping the cable by frictional engagement for driving and braking the cable, a main cable winding means, a drive transmission from said winding means to the mechanism whereby the latter can be connected to said winding means for cable driving purposes and disconnected from said winding means for cable braking purposes, and, in that transmission, a coupling comprising an input shaft rotatable from said winding means, an output shaft joined to the mechanism, an arrangement for controlling the speed of rotation of the output shaft with respect to the input shaft and the torque transmited by the latter to the output shaft, and means for indicating that torque.

7. Submarine cable laying and recovering machinery as claimed in claim 4 and further comprising a mounting plate on which the braking means are mounted, the mounting plate being movable about the axis of the rotatable carrier, and means for indicating the degree of movement of the mounting plate.

References Cited in the file of this patent

UNITED STATES PATENTS

| | | |
|---|---|---|
| 2,151,570 | Shoults et al. | Mar. 21, 1939 |
| 2,563,153 | Britt | Aug. 7, 1951 |
| 2,609,181 | Jaeschke | Sept. 2, 1952 |
| 3,105,676 | Brockbank et al. | Oct. 1, 1963 |
| 3,106,325 | Kitching | Oct. 8, 1963 |

FOREIGN PATENTS

| | | |
|---|---|---|
| 507,855 | Germany | Sept. 20, 1930 |